LUTHER R. FAUGHT
Improvement in Horse Powers.
No. 121,048. Patented Nov. 21, 1871.
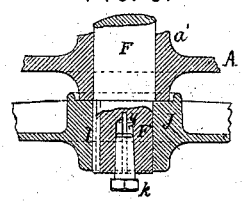
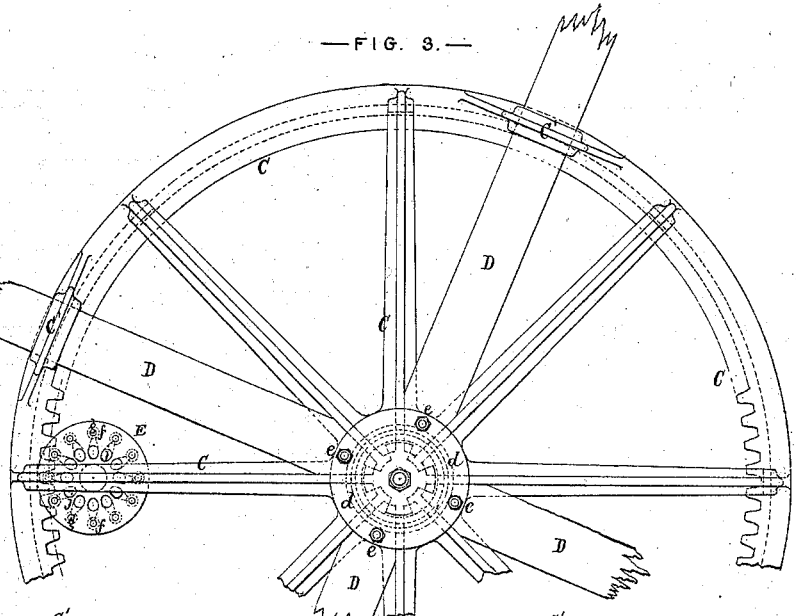
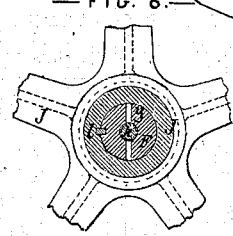
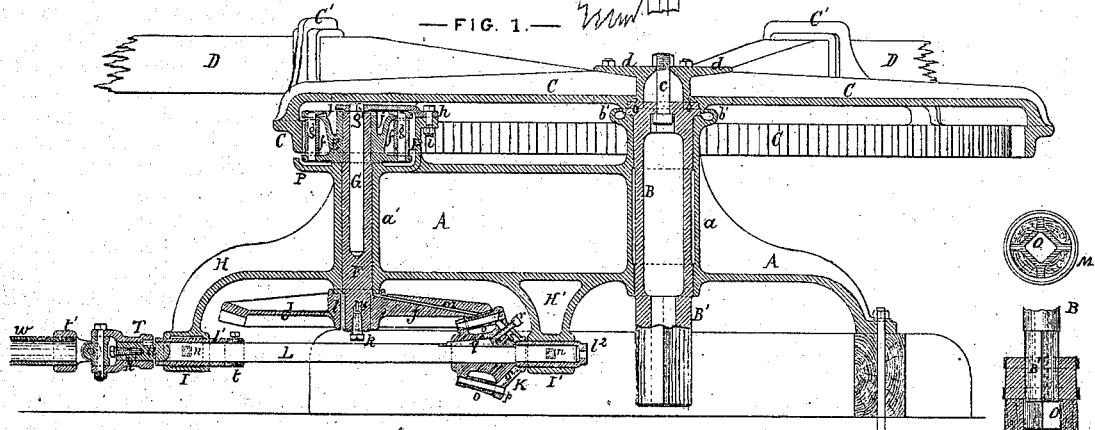
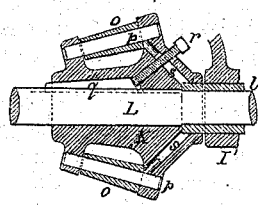
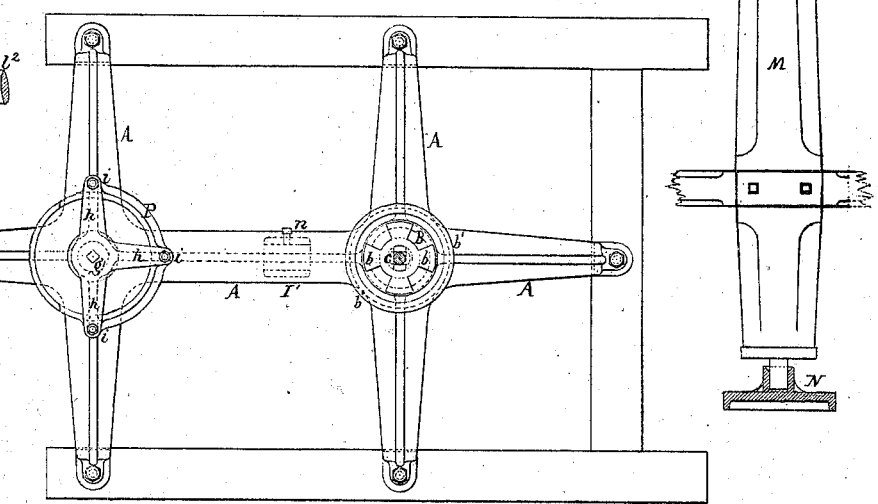
Witnesses:
Geo. H. Kirk
Wm Helme
Inventor:
L. R. Faught
AM. PHOTO-LITHOGRAPHIC CO. N.Y. (OSBORNE'S PROCESS.)

121,048

UNITED STATES PATENT OFFICE.

LUTHER R. FAUGHT, OF PHILADELPHIA, PENNSYLVANIA.

IMPROVEMENT IN HORSE-POWERS.

Specification forming part of Letters Patent No. 121,048, dated November 21, 1871.

*To all whom it may concern:*

Be it known that I, LUTHER R. FAUGHT, of the city and county of Philadelphia and State of Pennsylvania, have invented certain new and useful Improvements in Horse-Powers, the following being a specification of my said improvements:

My invention relates to that class of horse-powers which are termed lever-powers, and in which a revolving motion about a vertical axis is imparted to a large driving cog-wheel by the direct pull of one or more horses attached to the outer end of radial beams extending in a horizontal plane from the axis or shaft of this cog-wheel, the horses walking in a circular course and transmitting their driving power from the slowly-revolving first shaft to the machinery, to be set in motion through a train of gear-wheels relatively so proportioned as to revolve the last shaft in the power machine at the greatly-increased speed required for economical transmission of the power therefrom by means of pulleys and belts.

Horse-powers of this class are extensively used for driving cotton-gins, and for this purpose it is found most convenient to place the machine on the second floor of the gin-house. In such cases the horses walk in a circular course on the ground beneath the floor which carries the machine, and are attached to an upright shaft or king-post, which, as heretofore constructed, carried the large first driving-wheel of the machine at the top, and extends to the ground, where it revolves in a step-bearing. But this manner of locating the machine upon a yielding floor of considerable span between its supports is attended with much inconvenience and destructive wear of the gearing, caused by the alternate depression and rising of the floor under its constantly-changing loads. Various means have been sought and devised for adjusting the gearing by the use of sliding boxes and screws, or otherwise, (*vide* patent of T. J. Bottom, dated February 5, 1861,) so as to keep the teeth properly in gear, and thereby to prevent breakage of wheels or undue friction. These devices, however, as heretofore arranged, were dependent for their proper action upon the careful and frequent attendance of the operatives to their adjustment.

Now, the first object of my invention is to provide a means of obtaining a higher mechanical perfection in the operation of a compensating device for machines placed upon an elastic yielding floor, and to prevent the defects which have heretofore detracted from its efficiency by making the compensating device self-adjusting under all conditions and varying depressions of the floor without manual labor or attention of any kind on the part of the operative. The nature of this part of my invention consists in providing the lower part of the first shaft of the machine with a long squared or splined extension, which projects below its bearing in the frame of the machine, and to which a conformingly-shaped sleeve or socket in the upper end of the king-post is so fitted that its rotative motion will be duly imparted to the said first shaft of the machine, while the latter may slide in the direction of its axis within the driving socket of the king-post, and thus yield to the vibrations or depressions of the floor without injury to the gearing or bearings of the machine. A second feature of my present improvement in horse-powers relates to the use of a spur-pinion ordinarily placed upon an overhang on the second shaft of the machine, and driven by a large internal wheel upon the first shaft; and the improvement consists in making the upper end of the second shaft hollow, and providing an auxiliary internal bearing for the same, which bearing is secured to the main frame of the machine by a cross-piece spanning the narrow space between the upper face of the pinion and the arms of the large internal wheel, and thus forms an additional outer support for the second shaft; the object of which is to prevent the excessive strain and injurious friction and wear upon this shaft in its bearing under the pinion, which is a serious defect in the ordinary arrangement of this mode of gearing where the driven pinion overhangs. The bearings of the several shafts of my improved horse-powers are by preference all arranged in one piece or casting, constituting the main supporting structure of the machine; but the advantages attained by such arrangement of rigid bearings would be incomplete without the third part of my improvement, which consists of peculiar devices for securing the bevel-wheel upon the second shaft and the pinion and coupling on the third shaft in a very efficient manner, admitting, on the other hand, of their easy detachment from the shafts, so that these latter may be put in place or removed in an endwise direction through their rigid bearings, whereby the construction of the machine is so simplified that it may be erected or any part of the same adjusted or detached by any unskilled person. To this end I fit the lower end of the second shaft so to the bevel-wheel that it will easily enter the eye of the latter, and then, with the aid of a deep transverse incision in this end of the shaft, I expand the shaft with great force against the bore of the wheel by means of a tapered screw or plug tapped into the end of the shaft; and I also make use of a spline or feather, which is partly embedded in the shaft and partly in the hub of the wheel, and only bears sidewise for the purpose of torsional resistance, but is easily withdrawn after the taper screw is removed. I use the same efficient device for fastening a coupling to the outer end of the third shaft, and next to the inner bearing of this shaft I secure the bevel-pinion by means of a tapered feather so embedded in the shaft and pinion that it may be set up and securely tightened by an inclined set-screw in the pinion, while a light blow with a hammer against the protruding small end of this tapered key will loosen it after the set-screw has been partially withdrawn.

On reference to the annexed drawing making part of this specification, Figure 1 is a longitudinal section of a horse-power embodying my improvements. Fig. 2 is a plan of the main frame of the machine. Fig. 3 is a plan of the first driving-wheel and pinion. Fig. 4 is a detached sectional view of the bevel-pinion on the third shaft, illustrating clearly the mode of fastening the same and the manner of lubricating its teeth from the nearest journal-box of its shaft. Fig. 5 is a detached sectional view, and Fig. 6 a sectional plan, illustrative of the mode of securing the bevel-wheel to the second shaft of the machine. Figs. 7 and 8 represent a king-post with my improved devices for the transmission of power to the machine from below, and for preventing injury to the gearing or shafts of the machine from vibration or varying depressions of the floor on which the machine is supported.

In addition to the above-mentioned improvements the drawing illustrates certain recent improvements in cog-gearing, which, it should be here understood, are not a part of my present claims, but form the subject of Letters Patent granted to me October 3, 1871, and are fully described in the specification appended thereto.

A A is the main frame, in which all the working parts of the machine have their bearings, its general form and construction in detail being fully illustrated in Figs. 1 and 2. The large internal wheel C is the first driver of the system of wheels employed in the machine. It is secured to the top end of the first driving-shaft B by a strong bolt, $c$, and has a set of projections, $b\ b$, which, by interlocking with corresponding projections $b\ b$ on the shaft B in the manner of a clutch, resist the torsional strain of the work. For the purpose of securing the levers to which the horses are attached directly to the machine the wheel C is provided with a series of projections, C', with rectangular openings, through which the radially-extending levers D D are inserted, their inner ends resting in pockets in the hub $d$ of the wheel, to which they are further secured by pins or bolts $e\ e$. When, however, the machine is placed on an upper floor of a building and the power applied below, as is generally the case when the machine is used to furnish the power for driving cotton-gins, I make use of a king-post, M, that has its step-bearing N on the ground floor on which the horses walk. The top end of this king-post has, by preference, a square socket, O, into which a conformingly-squared projection, B', on the lower end of driving-shaft B is so fitted that, while it serves to transmit the revolving motion of the king-post to the machine, its endwise motion within the socket shall be permitted, so that any vibration of the upper floor or its varying depressions under different loads can in no way impair the working of the gearing in the machine or the transmission of power to the same. F is the second shaft of the machine. It has a long bearing in the vertical sleeve $a'$ of frame A, and carries at the top the pinion E, gearing with internal wheel C, and transmits the power at further increase of speed to a horizontal third shaft, L, by means of bevel-wheel J gearing with bevel-pinion K on L. The upper end of the shaft F is bored out in the manner clearly shown at Fig. 1, so as to form a long bearing for a stationary shaft or spindle, G, which is secured by a square, $g'$, to a flat cross-piece, $h$, carried by the main frame, and serves an important purpose by affording an outer additional bearing for shaft F, and thus relieving the same of the angular strain which would be otherwise exerted upon its bearing under the overhanging pinion. The latter is well protected from dust and other injury by a surrounding casing, P, formed in frame A. The manner of securing the bevel-wheel J upon the lower end of shaft F is fully shown in Figs. 5 and 6, where J represents the hub of the wheel. It is splined at $l$, and fitted easily to shaft F, which has a deep transverse incision, $y$, allowing a limited expansion by means of a tapered plug, $k$, screwed endwise into the shaft. Now, when the shaft F is pushed into place through the bearing $a'$ its lower end will easily enter the hub of wheel J, which is pushed on the shaft up to the shoulder; then the shaft is expanded sufficiently by means of plug $k$ to force it outward against the bore of the hub of J, and thus an amply-secured fastening is made, which may, however, be loosed at any time by merely unscrewing the plug $k$. The third shaft L has its bearings I and I' in two downward projections, H and H', on frame A. The inner one of these bearings I' is closed at one end to form a step for receiving the endwise thrust of the bevel-pinion. Both bearings, however, have bushings $l^1$ and $l^2$, in the manner fully shown in Fig. 1, secured by set-screws $n\ n'$, so that the journals may be easily repaired or renewed. To facilitate putting in place or removal of shaft L through its rigid bearings the bevel-pinion K must be so secured on this shaft as to admit of easy detachment. This is effected by the use of a screw, $r$, and tapered key, both in the pinion. The key is partly embedded into the shaft, and is forced into its tapered seat by the set-screw, whereby the pinion K is firmly secured on the shaft. To loosen and remove this pinion it is on the other hand only required to partly withdraw the screw $r$ and to back the key $q$ in the same direction. A coupling, T, is provided on the outer end of shaft L for the purpose of extending this shaft to any desired length; and I have by preference employed the same means for securing this coupling to shaft L that are above described as serving to secure the bevel-wheel J on shaft F. With the view to the greatest perfection in the described horse-power I prefer to use pinions E and K with the improved revolving cogs or rollers $f f o o$, as shown in the drawing, and for which Letters Patent were granted to me October 3, 1871. But it must be evident that my present improvements may be adapted with advantage to machines containing gearing of the ordinary construction.

I claim as my invention—

1. In lever-powers, the squared or splined extension B' of shaft B, in combination with a conformingly-shaped sleeve or socket O on the king-post M, the whole arranged and operating in the manner and for the purpose set forth.

2. In horse-powers having an internal driving wheel on the first shaft, the hollow shaft F and its pinion E, in combination with the stationary spindle G and support $h$, all arranged and operating in the manner and for the purpose set forth.

3. Securing the bevel-wheel J on the shaft F by means of the tapered screw or plug $k$ and transverse incision $y$, in the manner and for the purpose set forth.

4. In combination with pinion K and shaft L, the tapered key $q$ and set-screw $r$, all relatively arranged and operating as set forth.

L. R. FAUGHT.

Witnesses:
   GEO. H. KIRK,
   WM. HELME.

(159)